(12) United States Patent
Hochstetter et al.

(10) Patent No.: US 10,675,785 B2
(45) Date of Patent: Jun. 9, 2020

(54) FIBROUS MATERIAL IMPREGNATED WITH THERMOPLASTIC POLYMER

(71) Applicant: Arkema France, Colombes (FR)

(72) Inventors: Gilles Hochstetter, L'Hay les Roses (FR); Mathieu Capelot, Bernay (FR); Denis Huze, Fontaine sous Jouy (FR); François Tanguy, Mantes-la-Jolie (FR); Thibaut Savart, Sauvagnon (FR); Arthur Pierre Babeau, Pau (FR); Patrice Gaillard, Hagetaubin (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 16/623,991

(22) PCT Filed: Jun. 21, 2018

(86) PCT No.: PCT/EP2018/066561
§ 371 (c)(1),
(2) Date: Dec. 18, 2019

(87) PCT Pub. No.: WO2018/234436
PCT Pub. Date: Dec. 27, 2018

(65) Prior Publication Data
US 2020/0139586 A1    May 7, 2020

(30) Foreign Application Priority Data
Jun. 22, 2017  (FR) .................................... 17 55702

(51) Int. Cl.
*C08L 77/06* (2006.01)
*B29B 15/12* (2006.01)
(Continued)

(52) U.S. Cl.
CPC ............. *B29B 15/125* (2013.01); *C08J 5/042* (2013.01); *B29K 2101/12* (2013.01); *C08J 2377/06* (2013.01)

(58) Field of Classification Search
CPC ..................................................... B29B 15/125
(Continued)

(56) References Cited

U.S. PATENT DOCUMENTS 4,541,884 A    9/1985  Cogswell et al.
4,883,625 A    11/1989  Glemet et al.
(Continued)

FOREIGN PATENT DOCUMENTS

DE      1629830 A1    1/1971
EP      0201367 A1    11/1986
(Continued)

OTHER PUBLICATIONS

International Search Report (PCT/ISA/210) dated Oct. 1, 2018, by the European Patent Office as the International Searching Authority for International Application No. PCT/EP2018/066564.
(Continued)

*Primary Examiner* — Brent T O'Hern
(74) *Attorney, Agent, or Firm* — Buchanan Ingersoll & Rooney P.C.

(57) ABSTRACT

An impregnated fibrous material comprising a fibrous material made of continuous fiber and at least one thermoplastic polymer matrix, wherein the at least one thermoplastic polymer is an non-reactive amorphous polymer, the glass transition temperature of which is such that Tg≥80° C., or a non-reactive semi-crystalline polymer, the melting temperature of which is Tf≥150° C., the fiber volume ratio is constant in at least 70% of the volume of the tape or ribbon, the fiber ratio in the pre-impregnated fibrous material rang-
(Continued)

ing from 45 to 65% by volume, the porosity rate in the pre-impregnated fibrous material being less than 10%.

17 Claims, 6 Drawing Sheets

(51) Int. Cl.
*C08J 5/04* (2006.01)
*B29K 101/12* (2006.01)

(58) Field of Classification Search
USPC .......................................................... 428/220
See application file for complete search history.

(56) References Cited

U.S. PATENT DOCUMENTS

| | | |
|---|---|---|
| 2002/0197397 A1 | 12/2002 | Staheli |
| 2008/0274355 A1 | 11/2008 | Newel |
| 2014/0005331 A1 | 1/2014 | Johnson et al. |
| 2014/0155540 A1 | 6/2014 | Imai et al. |
| 2015/0258742 A1 | 9/2015 | Hochstetter et al. |
| 2015/0267050 A1* | 9/2015 | Briffaud ............... C08G 69/265 524/538 |
| 2016/0347009 A1 | 12/2016 | Gaillard et al. |
| 2017/0165875 A1 | 6/2017 | Gaillard et al. |

FOREIGN PATENT DOCUMENTS

| | | |
|---|---|---|
| EP | 0287427 A1 | 10/1988 |
| EP | 0324680 A2 | 7/1989 |
| EP | 0335186 A2 | 10/1989 |
| EP | 0406067 A1 | 1/1991 |
| EP | 0425341 A1 | 5/1991 |
| EP | 0581641 A1 | 2/1994 |
| EP | 0581642 A2 | 2/1994 |
| EP | 0739924 A1 | 10/1996 |
| EP | 1505099 A2 | 2/2005 |
| EP | 2586585 A1 | 5/2013 |
| EP | 2725055 A1 | 4/2014 |
| FR | 2991331 A1 | 12/2013 |
| FR | 2997035 A1 | 4/2014 |
| FR | 2997036 A1 | 4/2014 |
| FR | 2997089 A1 | 4/2014 |
| FR | 3017329 A1 | 8/2015 |
| FR | 3017330 A1 | 8/2015 |
| FR | 3019825 A1 | 10/2015 |
| FR | 3037962 A1 | 12/2016 |
| FR | 3039554 A1 | 2/2017 |
| JP | 2013132890 A | 7/2013 |
| WO | 8700387 A1 | 1/1987 |
| WO | 9220521 A1 | 11/1992 |
| WO | 9628258 A1 | 9/1996 |
| WO | 2008135663 A2 | 11/2008 |
| WO | 2012066241 A2 | 5/2012 |
| WO | 2014064375 A1 | 5/2014 |
| WO | 2015121583 A2 | 8/2015 |
| WO | 2015159016 A1 | 10/2015 |
| WO | 2016062896 A1 | 4/2016 |
| WO | 2017017388 A1 | 2/2017 |
| WO | 2018115736 A1 | 6/2018 |
| WO | 2018115737 A1 | 6/2018 |
| WO | 2018115738 A1 | 6/2018 |
| WO | 2018115739 A1 | 6/2018 |

OTHER PUBLICATIONS

Written Opinion (PCT/ISA/237) dated Oct. 1, 2018, by the European Patent Office as the International Searching Authority for International Application No. PCT/EP2018/066564.
"International Search Report (with English Translation) and Written Opinion issued in corresponding International Patent Application No. PCT/EP2018/066555, 13 pages (dated Jan. 10, 2018)."
"International Search Report (with English Translation) and Written Opinion issued in corresponding International Patent Application No. PCT/EP2018/066567, 21 pages (dated Sep. 26, 2018)."
International Search Report (PCT/ISA/210) dated Oct. 4, 2018, by the European Patent Office as the International Searching Authority for International Application No. PCT/EP2018/066561.
Written Opinion (PCT/ISA/237) dated Oct. 4, 2018, by the European Patent Office as the International Searching Authority for International Application No. PCT/EP2018/066561.
Miller, A. et al., "Impregnation Techniques for Thermoplastic Matrix Composites", Polymers and Polymer Composites, pp. 459-481, vol. 4, No. 1, Jan. 1, 1996, XP000658227.

* cited by examiner

FIBROUS MATERIAL IMPREGNATED WITH THERMOPLASTIC POLYMER

CROSS REFERENCE TO RELATED APPLICATIONS

The present application is a U.S. national stage of international application no. PCT/EP2018/066561, filed on Jun. 21, 2018, which claims priority to French application no. 1755702, filed on Jun. 22, 2017.

FIELD OF INVENTION

The present invention relates to a fibrous material, in particular a single-layer material, impregnated with a thermoplastic polymer.

More specifically, the invention relates to a fibrous material, in particular a single-layer material, impregnated with thermoplastic polymer, in particular the fiber count for carbon fibers greater than or equal to 30K, in particular greater than or equal to 50K, where the grammage of the fiberglass is greater than 1200 Tex, and for which the fiber level by volume is in particular constant, specifically the fiber level by volume is constant and at least 70% of the volume of the strip or ribbon.

In the present description, "fibrous material" is understood to mean an assembly of reinforcing fibers. Before forming, it has the form of rovings. After forming, it has the form of strips (or tape), ribbon or layers. When the reinforcing fibers are continuous, the assembly thereof makes a unidirectional reinforcement or a woven or nonwoven textile (NCF). When the fibers are short, assembly thereof makes a felt or fiber mat.

Such impregnated fibrous materials are in particular intended for implementing lightweight composite materials for the production of mechanical parts having a three-dimensional structure and having good mechanical and thermal properties. When the fibers are carbon or the resin is filled with suitable additives, these fibrous materials are capable of dissipating electrostatic charges. The use of fire-resistant resins or fire-resistant additives in resins that are not fire-resistant allows impregnated fibrous materials to be fire-resistant. They therefore have properties compatible with production of parts in particular in the mechanical, aeronautic, naval, automobile, oil and gas, in particular offshore, gas storage, energy, health and medical, sports and recreation, and electronics fields.

Such impregnated fibrous materials are also called composite materials. They comprise the fibrous material, made up of reinforcing fibers, and the matrix formed of the polymer impregnating the fibers. The first role of this material is to keep the reinforcing fibers in a compact shape and to give the final product the desired shape. This matrix also transfers the load between the fibers and therefore improves the mechanical resistance of the composite. Such a matrix also serves to protect the reinforcing fibers against abrasion and an aggressive environment, to control the surface appearance and to disperse possible loads among the fibers. The role of this matrix is important for the long-term resistance of the composite material, in particular as it relates to fatigue and flow.

DESCRIPTION OF RELATED ART

Good quality three-dimensional composite parts produced from impregnated fibrous materials generally follows from mastery of the method for impregnating the reinforcing fibers with thermoplastic polymer and therefore of the resulting impregnated fibrous material.

In the present description, the term "strip" is used to denote strips of fibrous material whose width is greater than or equal to 400 mm. The term "ribbon" is used to denote ribbons whose calibrated width is less than or equal to 400 mm.

The term "roving" is also used to denote the fibrous material.

Until now, strips of fibrous material reinforced by impregnating with thermoplastic polymer or thermosetting polymer were produced according to several methods which depend in particular on the nature of the polymer, the type of desired final composite material and the field of application thereof, where some of these methods were made of an impregnation step followed by a hot calendaring step of the impregnated fibrous material or a drying step which could be followed by a step of melting the thermoplastic polymer.

Thus the technologies for impregnating in wet route or by means of a liquid or very low viscosity precursor, polymerizing in situ, are often used for impregnating reinforcing fibers by thermosetting polymers, like epoxy resins for example, as described in the patent WO 2012/066241A2. These technologies are generally not directly applicable to impregnating with thermoplastic polymers because these rarely have liquid precursors.

The methods for impregnating by crosshead extrusion of a molten polymer are only suited for the use of low viscosity thermoplastic polymers. Thermoplastic polymers, specifically those with high glass transition temperature, have a molten state viscosity too high to allow satisfactory impregnation of fibers, and good quality semifinished or finished products.

The application US 2014/0005331A1 describes a method for the preparation of impregnated fibers with a polymer resin, where the resulting strip is asymmetric, meaning that it has a polymer-rich surface and an opposite fiber-rich surface.

The method is done by molten route with a device only allowing predominant impregnation on one of the surfaces.

Another known method for impregnation is the continuous passage of fibers in an aqueous polymer powder dispersion or an aqueous polymer particle dispersion or aqueous polymer emulsion or suspension. For an example refer to the document EP 0,324,680. In this method, a dispersion of micrometric size (about 20 μm) powders is used. After dipping in the aqueous solution, the fibers are impregnated with the polymer powder. The method then involves a drying step consisting of sending the impregnated fibers through a first oven in order to evaporate the water absorbed during dipping. A step of heat treatment, consisting of sending the impregnated and dried fibers through a second high-temperature heating zone, is next necessary to melt the polymer in order for it to adhere, spread and cover the fibers.

The main disadvantage of this method is the inhomogeneity of the deposit which is sometimes imperfect, with coating occurring only on the surface. Further, the range of particle sizes in the powders used is usually fine (typically 20 μm D50 by volume) and this also increases the final cost of the ribbon or impregnated layer.

Also, the drying step in this method leads to a porosity in the impregnated fibers because of evaporation of the water. Additionally, the resulting material is a fibrous material covered with polymer and therefore a multilayer material.

Document EP 0,406,067 filed jointly in the names of Atochem and the French government, and also document EP 0,201,367, describe for their part an impregnation technique on a fluidized bed of polymer powder. The fibers go into a closed fluidization tank where, as it relates to EP 0,406,067, they could be separated from each other by means of grooved rollers or cylinders, and where the fibers are electrostatically charged by rubbing on contact with the rollers or cylinders. With this electrostatic charge, the polymer powder can adhere to the surface of the fibers and thus impregnate them.

As above, the resulting material is therefore a fibrous material covered with polymer and therefore a multilayer material.

International application WO 2016/062896 describes a powdering of roving by a free-charge electrostatic method, by grounding the roving and applying a potential difference between the tip of a spray gun or nozzle and the roving.

Document WO 2008/135663 describes, in a third variant, implementation of an impregnated fiber ribbon. In this document, the ribbon of fibers is already preformed prior to the impregnation step, in the form of a ribbon formed of fibers held together by restraining means. The ribbon thus preformed is charged with static electricity and then plunged into an enclosure containing a fluidized bed of fine polymer particles suspended in compressed air so as to coat the ribbon with a polymer coating layer. Such a document does not allow for a simultaneous impregnation of one or more fiber rovings or the continuous shaping of impregnated rovings in ribbon form.

International application WO 2015/121583 describes a production method for a fibrous material impregnated by impregnation of said material in a fluidized bed and then hot calendaring of said rovings allowing the shaping of said rovings or of said parallel rovings of said material.

The hot calendaring is done downstream from the impregnation device and serves to homogenize the distribution of the polymer and the impregnation of the fibers, but does not allow the production of a homogeneously impregnated ribbon. The resulting porosity is not quantified.

Document EP 0,335,186 describes the possibility of using a calendar or press for compacting a composite comprising impregnated metal fibers, used for the production of molded bodies for armoring against electromagnetic radiation. It does not describe the fact of impregnating one more rovings of fibers and shaping them, continuously, in the shape of one or more unidirectional parallel ribbons by heating after impregnation by means of the heat conducting supporting part and at least one heating system.

The quality of the impregnated fibrous material ribbons and therefore the quality of the final composite material depends not only on the homogeneity and impregnation of the fibers and therefore the control and reproducibility of the porosity of the impregnated fibrous materials and the single layer appearance thereof, but also on the dimension and more specifically the width and thickness of the final ribbons. Uniformity and control of these dimensional parameters in fact improves the mechanical strength of the composite materials resulting (from the ribbons).

The current techniques for impregnation of fibrous materials and forming such impregnated fibrous materials in the shape of calibrated ribbons therefore have several disadvantages. It is for example difficult to homogeneously heat a molten mixture of thermoplastic polymers in the die and die outlet through to the core of the material, which alters the impregnation quality. Further, the existing temperature difference between the fibers and a molten polymer mixture near the impregnation die also alters the impregnation quality and homogeneity. Further, this molten route impregnation mode does not produce a high fiber level or high production rates because of the high viscosity of the thermoplastic resins, in particular when they have high glass transition temperatures, which is necessary to get high performance composite materials.

Slitting layers to produce calibrated ribbons and trimming these ribbons leads to an additional production cost. Slitting further generates significant problems with dust which pollutes the ribbons of impregnated fibrous materials used for the robot application and can lead to malfunctions of the robots and/or imperfections in the composites. This potentially leads to repair costs for the robots, production shut down and scrapping of noncompliant products. Finally, during the slitting step, a non-negligible quantity of fiber is damaged, resulting in a loss of properties, and in particular a reduction of the mechanical strength and conductivity of the ribbons of impregnated fibrous material.

In addition to the additional cost and damage to the ribbons caused by slitting, another disadvantage of slitting layers wider than 400 mm in particular is the maximum length of the resulting ribbons. In fact, the length of these wide layers only rarely exceeds 1000 to 1200 m linear, in particular because of the final weight of the resulting layers which must be compatible with the splitting method. Hence for the implementation of many composite parts by application of calibrated ribbons, in particular for large parts, a 1000 m spool is too short to avoid resupplying the robot during production of the part, there again leading to an extra cost. To increase the dimension of the slit ribbons, it is possible to splice several spools; this method consists of superimposing and hot welding two ribbons, leading to an excess thickness in the final ribbon, and therefore defects to appear during application with an excess thickness placed randomly in the final part.

Additionally, with the various methods described above it is not possible to produce homogeneous impregnation of the roving and therefore a single layer fibrous material, which is detrimental to the applications listed above.

The goal of the invention is therefore to remedy at least one of the disadvantages from the prior art and in particular to produce fibrous material in particular single-layer fibrous material. In particular, the invention aims to propose an impregnated fibrous material, in particular a single-layer fibrous material, and in particular one in which the fiber count for carbon fibers is greater than or equal to 30K, in particular greater than or equal to 50K, or the grammage for the fiberglass is greater than or equal to 1200 Tex, in particular greater than or equal to 2400 Tex, greater than or equal to 4800 Tex and in which the fiber level by volume is in pa rticular constant in at least 70% of the volume of the strip or ribbon, where the impregnation of the fibers is homogeneous, said material has controlled dimensions, with a reduced, controlled and reproducible porosity and also a homogeneous distribution of the fibers of said fibrous material on which the performance of the final composite part depends.

BRIEF SUMMARY OF THE INVENTION

For this purpose, the object of the invention is an impregnated fibrous material comprising a continuous-fiber fibrous material and at least one thermoplastic polymer matrix characterized in that said at least one thermoplastic polymer is a nonreactive amorphous polymer whose glass transition temperature is such that Tg≥80° C., notably Tg≥100° C., in particular ≥120° C., notably ≥140° C., or a nonreactive semicrystalline polymer whose melting point Tm≥150° C., and the fiber level by volume is constant in at least 70% of the volume of the strip or ribbon, in particular in at least 80% of the volume of the strip or ribbon, in particular in at least 90% of the volume of the strip or ribbon, more specifically in at least 95% of the volume of the strip or ribbon, where the fiber level in said impregnated fibrous material is included from 45 to 65% by volume, preferably from 50 to 60% by volume, notably from 54 to 60% over both surfaces of said fibrous material, and the porosity level in said impregnated fibrous material is less than 10%, notably less than 5%, in particular less than 2%.

Advantageously, said impregnated fibrous material is inflexible.

Since the impregnation in the method from the invention is done to the core, it makes the impregnated fibrous material inflexible in contrast with the impregnated fibrous materials of the art in which the impregnation is partial, which results in a flexible fibrous material.

Advantageously, said impregnated fibrous material has no liquid crystal polymers (LCP).

LCP are such as described in the international application WO 2017/017388.

LCP are in particular selected from aromatic polyesters obtained by polycondensation of 4-hydroxybenzoic acid or hydroxynaphthenic acid (6-hydroxy-2-naphthoic acid), copolyesters based on two preceding hydroxy acids or among aromatic copolyesters-amides of analogous structure. Vectran® can be given as a known example of a LCP aromatic copolyester. Preferably, said hydroxybenzoic acid and hydroxynaphthenic acid-based aromatic copolyesters have a hydroxybenzoic (hydroxybenzoate) level around 70 to 75% by weight and from 25 to 30% by weight of hydroxynaphthenic acid (hydroxynaphthenate).

Advantageously, the fiber count in said fibrous material is for carbon fibers greater than or equal to 30K, preferably greater than or equal to 50K.

Advantageously, the grammage for the fiberglass is greater than or equal to 1200 Tex, in particular greater than or equal to 2400 Tex, greater than or equal to 4800 Tex.

Tex means 1000 m of base yarn weighs 1 g.

Advantageously, the distribution of fibers is homogeneous in at least 95% of the volume of the strip or ribbon.

The fiber level is measured by volume locally on a representative elemental volume (REV).

The term "constant" indicates that the fiber level by volume is constant up to the measurement uncertainty which is approximately 1%.

The term "homogeneous" means that the impregnation is uniform and that there are no dry fibers, meaning fibers that are not impregnated, in at least 95% of the volume of the strip or ribbon of impregnated fibrous material.

Advantageously, said impregnated fibrous material is a single-layer material.

The term "single layer" means that when the fibrous material is impregnated, said fibrous material and polymer are indissociable from each other and form a material made up of a single fiber and polymer-based layer, since the impregnation is done particularly homogeneously and to the core, and in particular with at least one spreading during the impregnation.

Polymer Matrix

Thermoplastic, or a thermoplastic polymer, is understood to mean a material, generally solid at room temperature, which can be semicrystalline or amorphous, and which softens during a temperature increase, in particular after passing the glass transition temperature (Tg) thereof and flows at higher temperature when it is amorphous, or showing a clear melting on passing through the melting point (Tm) thereof when it is semicrystalline, and which returns to a solid when the temperature drops below the crystallization temperature thereof (if semicrystalline) and below the glass transition temperature thereof (if amorphous).

Tg and Tm are determined by differential calorimetric analysis (DSC) according to the standards 11357-2: 2013 and 11357-3: 2013, respectively.

The polymer matrix is a nonreactive amorphous polymer having a glass transition temperature Tg greater than or equal to 80° C., notably greater than or equal to 100° C., in particular greater than or equal to 120° C., notably greater than or equal to 140° C., or is a nonreactive semicrystalline polymer whose melting point Tm is greater than 150° C.

The expression "non-reactive polymer" means that the molecular weight is no longer likely to change significantly, i.e. that its number-average molecular weight (Mn) changes by less than 50% when it is used and therefore corresponds to the final polyamide polymer of the thermoplastic matrix.

As for the polymer making up the impregnation matrix for the fibrous material, it is advantageously a thermoplastic polymer or a mixture of thermoplastic polymers. This polymer or mixture of thermoplastic polymers can be crushed into powder form in order to be usable in a device such as a tank, in particular in a fluidized bed or in an aqueous dispersion.

The device, in tank form, in particular fluidized bed form, can be open or closed.

Optionally, the thermoplastic polymer or thermoplastic polymer mixture further comprises carbon-based fillers, in particular carbon black or carbon nanofillers, preferably selected from among carbon nanofillers, in particular graphenes and/or carbon nanotubes and/or carbon nanofibrils or mixtures thereof. These fillers serve to conduct electricity and heat, and consequently serve to make melting of the polymer matrix easier when it is heated.

Optionally, said thermoplastic polymer comprises at least one additive, notably selected from a catalyst, antioxidant, thermal stabilizer, UV stabilizer, light stabilizer, lubricant, filler, plasticizer, flame retardant, nucleating agent, colorant, electrical conductor, heat conductor or a mixture thereof.

Advantageously, said additive is selected from a flame retardant, electrical conductor and heat conductor.

According to another variant, the thermoplastic polymer or mixture of thermoplastic polymers can further comprise liquid crystal polymers or cyclic poly(butylene terephthalate), or mixtures containing them, like the CBT100 resins sold by CYCLICS CORPORATION. With these compounds, the polymer matrix can be fluidified in the molten state, for better penetration to the core of the fibers. Depending on the nature of the thermoplastic polymer, or polymer mixture, used to implement the impregnation matrix, notably the melting point thereof, one or another of these compounds will be chosen.

The thermoplastic polymers going into the makeup of the impregnation matrix of the fibrous material can be selected from:

polymers and copolymers from the family of aliphatic or cycloaliphatic polyamides (PA) or semi-aromatic PA (also called polyphthalamides (PPA));

polyureas, in particular aromatic polyureas;

polymers and copolymers from the acrylic family like polyacrylates and more specifically polymethylmethacrylate (PMMA) or derivatives thereof;

polymers and copolymers from the polyaryletherketone (PAEK) family like poly(etheretherketone) (PEEK), or poly(aryletherketoneketones) (PAEKK) like poly (etherketoneketone) (PEKK) or derivatives thereof;

aromatic polyetherimides (PEI);
polyarylsulfides, in particular polyphenylenesulfides (PPS);
polyarylsulfones, in particular polyphenylenesulfones (PPSU);
polyolefins, in particular polypropylene (PP);
polylactic acid (PLA);
polyvinyl alcohol (PVA);
fluorinated polymers, in particular poly(vinylidene fluoride) (PVDF), or polytetrafluoroethylene (PTFE) or polychlorotrifluoroethylene (PCTFE);
and mixtures thereof.

Advantageously, when said polymer is a mixture of two polymers, P1 and P2, the proportion by weight of polymer P1 and P2 is included between 1-99% to 99-1%.

Advantageously, when said thermoplastic polymer is a mixture, and when the preimpregnation method uses a dry powder, this mixture comes in the form of a powder resulting either from dry blending before introduction into the preimpregnation tank or by dry blending directly in the tank or even by milling of a compound made in advance in an extruder.

Advantageously, this mixture is composed of a powder obtained by dry blending before adding into the tank or directly in the tank, and this mixture of two polymers P1 and P2 is a mixture of PEKK and PEI.

Advantageously, the PEKK/PEI mixture is included from 90-10% to 60-40% by weight, in particular from 90-10% to 70-30% by weight.

The number-average molecular weight, Mn, of said final polymer for the thermoplastic matrix is preferably in a range extending from 10,000 to 40,000, preferably from 12,000 to 30,000. These Mn values may correspond to inherent viscosities greater than or equal to 0.8, as determined in m-cresol according to the ISO 307:2007 standard but by changing the solvent (use of m-cresol instead of sulfuric acid and the temperature being 20° C.).

The Mn are in particular determined by the calculation of the level of terminal functions determined by potentiometric titration in solution.

The masses Mn can also be determined by steric exclusion chromatography or by NMR.

The nomenclature used to define the polyamides is described in the ISO 1874-1:2011 standard "Plastics-Polyamide (PA) Moulding And Extrusion Materials—Part 1: Designation," in particular on page 3 (Tables 1 and 2) and is well known to the person skilled in the art.

The polyamide can be a homopolyamide or copolyamide or a mixture thereof.

Advantageously, the polymers making up the matrix are selected from polyamides (PA), in particular selected from aliphatic polyamides, cycloaliphatic polyamides, and semi-aromatic polyamides (polyphthalamides) optionally modified by urea groups, and copolymers thereof, polymethylmethacrylate (PPMA) and copolymers thereof, polyether imides (PEI), and poly(phenylene sulfide) (PPS), poly(phenylene sulfone) (PPSU), polyetherketoneketone (PEKK), polyetheretherketone (PEEK), and fluorinated polymers like poly(vinylidene fluoride) (PVDF).

For the fluorinated polymers, a vinylidene fluoride homopolymer (VDF with formula $CH_2=CF_2$) or VDF copolymer comprising at least 50% by mass of VDF and at least one other monomer copolymerizable with VDF can be used. The VDF level must be over 80% by mass, even better 90% by mass, to provide good mechanical and chemical strength to the structural part, especially when it is subject to thermal and chemical stresses. The comonomer can be a fluoride monomer such as for example vinyl fluoride.

For structural parts that need to resist high temperatures, besides fluorinated polymers, advantageously according to the invention the following can be used: PAEK, poly(aryletherketone), such as poly(etherketones) PEK, poly(etheretherketone) PEEK, poly(etherketoneketone) PEKK, poly(etherketoneether ketoneketone) PEKEKK or PA having high glass transition temperature Tg).

Advantageously, said thermoplastic polymer is a nonreactive amorphous polyamide polymer whose glass transition temperature is such that Tg≥80° C., notably Tg≥100° C., in particular 120° C., notably 140° C., or a nonreactive semicrystalline polymer whose melting point Tm≥150° C.

Advantageously, the nonreactive semicrystalline polymer has a melting point Tm 150° C. and a glass transition temperature Tg 80° C., notably Tg 100° C., in particular 120° C., notably 140° C.

Advantageously, said polyamide is selected from aliphatic polyamides, cycloaliphatic polyamides and semi-aromatic polyamides (polyphthalamides).

Advantageously, said aliphatic polyamide prepolymer is selected from:
polyamide 6 (PA-6), polyamide 11 (PA-11), polyamide 12 (PA-12), polyamide 66 (PA-66), polyamide 46 (PA-46), polyamide 610 (PA-610), polyamide 612 (PA-612), polyamide 1010 (PA-1010), polyamide 1012 (PA-1012), polyamide 11/1010, and polyamide 12/1010, ora mixture thereof or a copolyamide thereof, and block copolymers, notably polyamide/polyether (PEBA) and said semi-aromatic polyamide is a semi-aromatic polyamide optionally modified with urea units, notably PA MXD6 and PA MXD10, ora semi-aromatic polyamide of formula X/YAr, such as described in EP 1,505,099, notably a semi-aromatic polyamide of formula A/XT in which A is selected from a unit obtained from an amino acid, a unit obtained from a lactam and a unit corresponding to the formula (Ca diamine)·(Cb diacid), with "a" representing the number of carbon atoms of the diamine and "b" representing the number of carbon atoms of the diacid, "a" and "b" each being between 4 and 36, advantageously between 9 and 18, the unit (Ca diamine) being selected from aliphatic diamines, linear or branched, cycloaliphatic diamines and alkylaromatic diamines and the unit (Cb diacid) being chosen from aliphatic, linear or branched diacids, cycloaliphatic diacids and aromatic diacids.

X·T denotes the unit obtained by polycondensation of the Cx diamine and terephthalic acid, where x represents the number of carbon atoms of the Cx diamine, where x is included between 6 and 36, advantageously between 9 and 18, notably a polyamide with formula A/6T, A/9T, A/10T or A/11T, where A is as defined above, in particular a PA 6/6T, PA 66/6T, PA 61/6T, PA MPMDT/6T, PA PA11/10T, PA 11/6T/10T, PA MXDT/10T, PA MPMDT/10T, PA BACT/10T, PA BACT/6T, PA BACT/10T/6T polyamide.

T corresponds to terephthalic acid, MXD corresponds to m-xylylene diamine, MPMD corresponds to methylpentamethylene diamine and BAC corresponds to bis(aminomethyl)cyclohexane.

Fibrous Materials:
Concerning the fibers making up said fibrous material, they are notably fibers of mineral, organic or plant origin in the form of rovings.

Advantageously, the fiber count per roving is for carbon fibers greater than or equal to 30K, preferably greater than or equal to 50K.

Advantageously, the grammage for the fiberglass is greater than or equal to 1200 Tex, in particular greater than or equal to 2400 Tex, greater than or equal to 4800 Tex.

Carbon fibers, fiberglasses, basalt fibers, silica fibers or silicon carbide fibers for example can be listed among the fibers of mineral origin. Thermoplastic or thermosetting polymer-based fibers, such as semi-aromatic polyamide fibers, aramid fibers or polyolefin fibers for example, can be listed among fibers of organic origin. Preferably, they are amorphous thermoplastic polymer-based and have a glass transition temperature Tg greater than the Tg of the thermoplastic polymer or polymer mixture making up the impregnation matrix when the matrix is amorphous or greater than Tm of the thermoplastic polymer or polymer mixture making up the impregnation matrix when the matrix is semicrystalline. Advantageously, they are semicrystalline thermoplastic polymer-based and have a melting point Tm greater than the Tg of the thermoplastic polymer or polymer mixture making up the impregnation matrix when the matrix is amorphous or greater than Tm of the thermoplastic polymer or polymer mixture making up the impregnation matrix when the matrix is semicrystalline. That way, there is no risk of melting of the organic fibers making up the fibrous material during impregnation by the thermoplastic matrix of the final composite. Natural fibers based on linen, hemp, lignin, bamboo, silk notably spider silk, sisal and other cellulose fibers, in particular viscose can be listed among fibers of plant origin. These fibers of plant origin can be used pure, treated or else coated with a coating layer, in order to indeed prove adhesion and impregnation of the thermoplastic polymer matrix.

The fibrous material can also be a fabric, braided or woven with fibers.

It can also correspond to fibers with holding yarns.

These constituent fibers can be used alone or in mixtures. Thus, organic fibers can be mixed with mineral fibers in order to be impregnated with thermoplastic polymer and to form the impregnated fibrous material.

The rovings of organic fibers can have several linear densities. They can further have several geometries. The fibers can come in cut fiber form, which then make up felts or mats which can come in the form of strips, layers or pieces, or in continuous fiber form, which make up 2D fabrics, nonwovens (NCF), braids or rovings of unidirectional (UD) or nonwoven fibers. The fibers making up the fibrous material can further come in the form of a mixture of these reinforcing fibers of varied geometry. Preferably the fibers are continuous.

Preferably the fibrous material is made up of continuous carbon, glass or silicon carbide fibers or mixtures thereof, in particular carbon fibers. It is used in the form of a roving or several rovings.

In the impregnated materials also called "ready to use," the thermoplastic polymer or mixture of polymers for impregnation is uniformly and homogeneously distributed around the fibers. In this type of material, the thermoplastic polymer for impregnation must be distributed within the fibers the most homogeneously possible in order to get a minimum of porosities, meaning a minimum of voids between the fibers. In fact, the presence of porosities in this type of material can act as stress concentration points, when placed under mechanical stress by traction for example, which then form failure initiation points for the impregnated fibrous material and make it mechanically fragile. A homogeneous distribution of the polymer or polymer mixture therefore improves the mechanical strength and homogeneity of the composite material formed from these impregnated fibrous materials.

Thus, in the case of "ready to use" impregnated materials, the fiber level in said impregnated fibrous material is included between 45 to 65% by volume, preferably from 50 to 60% by volume, in particular from 54 to 60% by volume.

The impregnation level can be measured by image analysis (notably using a microscope or camera or digital camera), from a transverse section of the ribbon, by dividing the surface area of the ribbon impregnated by the polymer by the total surface area of the product (impregnated surface area plus surface area of the porosities). In order to get a good quality image, it is preferable to coat the ribbon cut in the transverse direction thereof with a standard polishing resin and to polish with a standard protocol allowing the observation of the sample under at least 6 times microscopic enlargement.

Advantageously, the porosity level of said impregnated fibrous material is less than 10%, notably less than 5% and in particular less than 2%.

It must be noted that a null porosity level is difficult to reach and that consequently, advantageously the porosity level is greater than 0% but less than the levels given above.

The porosity level corresponds to the closed porosity level and can be determined either by electron microscope, or as being the relative difference between the theoretical density and the experimental density of said impregnated fibrous material as described in the examples part of the present invention.

Method for Preparation of the Fibrous Material

The impregnated fibrous material, in particular a single-layer material, can be prepared in two steps:

A first step of preimpregnation by a polymer matrix and a second step of heating by means of at least one supporting part (E) and at least one heating system.

First Step: Preimpregnation

The first step of preimpregnation to produce a material can be done according to techniques well known to the person skilled in the art and in particular selected from those described above.

Thus they can be done by a preimpregnation technology by powder deposition, by molten route, in particular by pultrusion, by cross-head extrusion of molten polymer, by continuous passage of the fibers in an aqueous polymer powder dispersion or aqueous polymer particle dispersion or aqueous polymer emulsion or suspension, by fluidized bed, equipped or not with at least one supporter (E'), by spraying by nozzle or spray gun by dry route in a tank equipped or not equipped with at least one supporter (E').

The supporter can be a concave, convex or cylindrical compression roller, in particular it is cylindrical.

Figure 1:
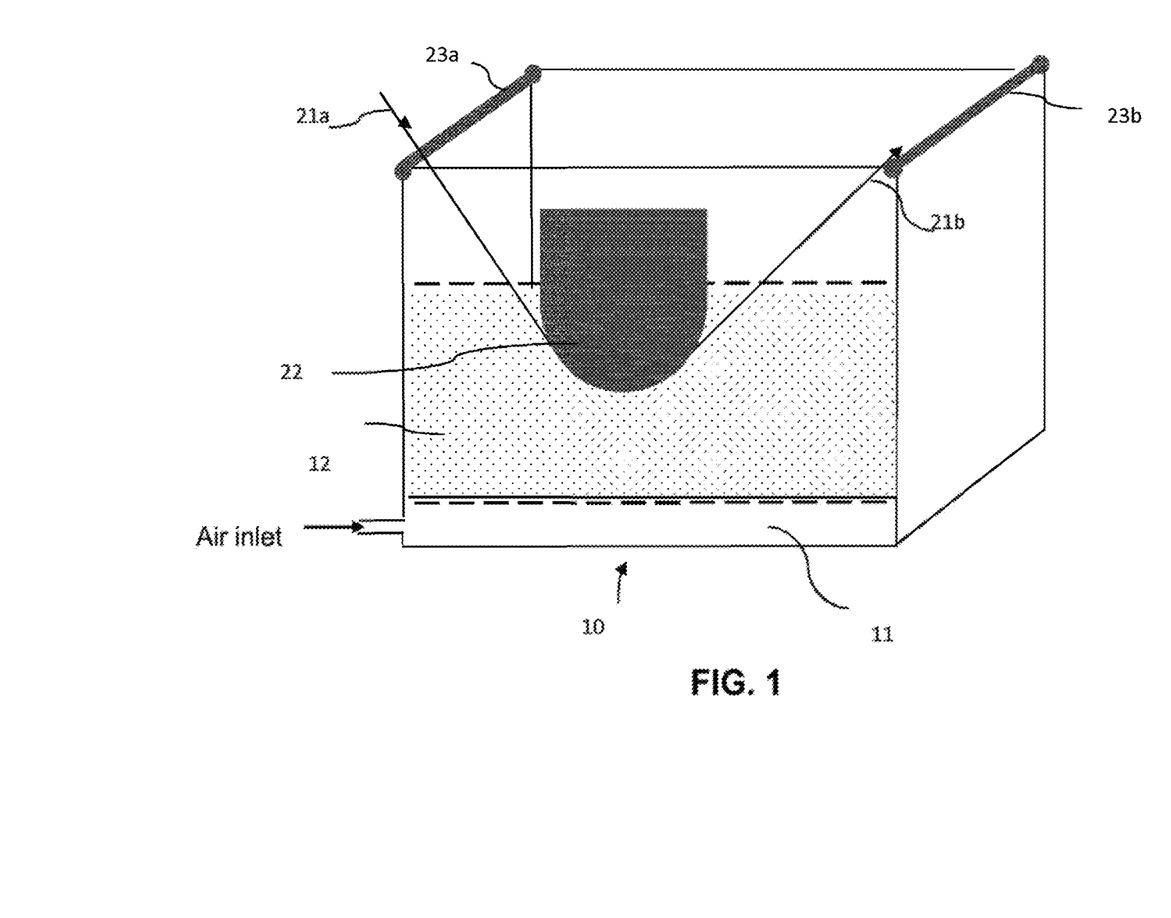
FIG. 1 details a tank (10) comprising a fluidized bed (12) with a supporting part, whose height is adjustable (22). The edge of the tank entry is equipped with a rotating roller 23a on which the roving 21a travels and the edge of the tank exit is equipped with a rotating roller 23b on which the roving 21b travels.
Figure 2:
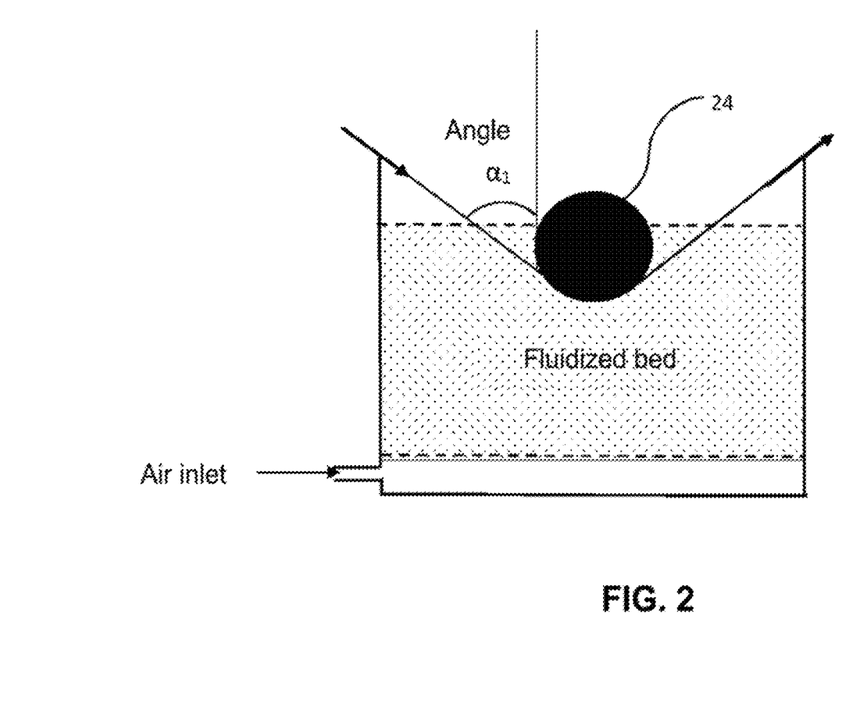
FIG. 2 presents describes an embodiment with a single compression roller, with a tank (10) comprising a fluidized bed (12) in which a single cylindrical compression roller (24) is present and showing the angle $\alpha_1$. The arrows near the fiber indicate the direction of travel of the fiber.

FIG. 1 shows an example of a tank provided with a supporter and FIG. 2 shows an example of a tank comprising a fluidized bed in which the supporter is a cylindrical compression roller.

The same tank can be used without a fluidized bed present and equipped with a spray gun.

The preimpregnation can also be done with the system such as defined above in which one or more supporter(s) (E") is (are) present upstream from said system, in particular before the tank in which the preimpregnation is done.

It must be noted that the supporting parts (E) and (E") can be identical or different whether regarding the material or the shape and properties thereof (diameter, length, width, height, etc. according to the shape).

Molten Route:

The preimpregnation step can be done by molten route, in particular by pultrusion.

Molten route preimpregnation techniques are well known to the person skilled in the art and are described in the above references.

The preimpregnation step is done in particular by crosshead extrusion of the polymer matrix and passage of said roving or rovings in this crosshead and then passage in the heated die, where the crosshead could be provided with fixed or rotating supporters on which the roving passes thus causing a spreading of said roving allowing a preimpregnation of said roving.

The preimpregnation can in particular be done such as described in US 2014/0005331A1 with the difference that the resin is supplied from both sides of said roving and there is no contact surface eliminating a part of the resin from both surfaces.

Advantageously, the preimpregnation step is done by molten route at high-speed, meaning with the feed speed of said roving or said rovings greater than or equal to 5 m/min, in particular greater than 9 m/min.

Fluidized Bed:

The preimpregnation step can be done in fluidized bed.

International application WO 2015/121583 describes an exemplary unit for implementation of a production method without the heating step by means of at least one supporting part.

The system describes the use of a tank comprising a fluidized bed to carry out the preimpregnation step and can be used in the context of the invention.

Advantageously, the tank comprising the fluidized bed is provided with at least one supporting part (E') (FIG. 1) which can be a compression roller (FIG. 2).

Supporting part (E') must be understood to mean any system on which the roving has the possibility of traveling in the tank. The supporting part (E') can have any shape so long as the roving can travel over it.

An exemplary supporting part (E') is detailed in FIG. 1, without restricting the invention thereto.

It must be noted that the supporting parts (E) and (E') can be identical or different whether regarding the material or the shape and properties thereof (diameter, length, width, height, etc. according to the shape).

However, the supporting part (E') is neither heating nor heated.

The step of pre-impregnating the fibrous material is done by passing one or more rovings in a continuous preimpregnation device comprising a tank (10) provided with at least one supporting part (E') and comprising a fluidized bed (12) of powder of said polymer matrix.

The powder of said polymer matrix or polymer is suspended in a gas G (for example, air) added to the tank and circulating in the tank (10) through a hopper (11). The roving(s) circulate through this fluidized bed (12).

The tank can have any shape, in particular cylindrical or parallelepipedic, in particular a rectangular parallelepiped or a cube, advantageously a rectangular parallelepiped.

The tank (10) can be an open or closed tank.

In the case where the tank is closed, it is then equipped with a sealing system so that the powder for said polymer matrix cannot exit said tank.

This preimpregnation step is therefore done by dry route, meaning that the thermoplastic polymer matrix is in powder form, notably suspended in a gas, in particular air, but cannot be dispersed in a solvent or water.

Each roving to be preimpregnated is unwound from a feed-reel device under traction generated by cylinders (not shown).

Each feed reel is provided with a brake (not shown) so as to apply a tension to each fiber roving. In this case, an alignment module serves to arrange the fiber rovings parallel to each other. In this way, the fiber rovings need not be in contact with each other, so that a mechanical breakdown of the fibers by friction with each other can be avoided.

The fiber roving or the parallel fiber rovings then pass into a tank (10) comprising in particular a fluidized bed (12) provided with a supporting part (E') which is a compression roller (24) in the case from FIG. 2. The fiber roving or parallel fiber rovings then leave the tank after preimpregnation after possible control of the residence time in the powder.

The expression "residence time in the powder" means the time during which the roving is in contact with said powder in the fluidized bed.

If the fibrous material, such as the glass or carbon fiber rovings, has a sizing, an optional step of de-sizing can be done before the fibrous material passes into the tank.

Advantageously, the tank used comprises a fluidized bed with a supporter and said preimpregnation step is done with a simultaneous spreading of said roving or rovings between the entry to and exit from the tank comprising said fluidized bed.

The expression "entry to the tank" corresponds to the vertical tangent to the edge of the tank which comprises the fluidized bed.

The expression "exit from the tank" corresponds to the vertical tangent to the other edge of the tank which comprises the fluidized bed.

The spreading consists of isolating each fiber making up said roving as much as possible from the other fibers which surround it in the space closest thereto. It corresponds to the transverse separation of the roving.

In other words, the transverse separation or the width of the roving increases between the entry to the tank comprising the fluidized bed and the exit from the tank comprising the fluidized bed and thus makes an improved preimpregnation of the fibrous material possible.

The use of at least one supporter (E'), in particular a cylindrical compression roller, in the preimpregnation step, therefore makes an improved preimpregnation possible compared to the methods from the prior art.

The expression "compression roller" means that the traveling roving rests partially or completely on the surface of said compression roller, which leads to the spreading of said roving.

Advantageously, said at least one compression roller has a cylindrical shape and the percentage of spreading of said roving or said rovings between the entry to and exit from the tank for said fluidized bed is included between 1% and 1000%, preferably between 100% and 800%, preferably between 200% and 800%, and preferably between 400% and 800%.

The percentage spreading is equal to the ratio of the final width of the roving to the initial width of the roving multiplied by 100.

The diameter of said at least one compression roller is included from 3 mm to 500 mm, preferably from 10 mm to 100 mm and in particular from 20 mm to 60 mm.

Under 3 mm, the deformation of the fiber induced by the compression roller is too great.

Advantageously, the compression roller is cylindrical and not grooved, and in particular it is metal.

When the supporting part (E') is at least one compression roller, according to a first variant, a single compression roller is present in the fluidized bed and said preimpregnation is done near the angle $\alpha_1$ formed by said roving or said rovings between the entry to said compression roller and the vertical tangent to said compression roller.

The angle $\alpha_1$ formed by said roving or rovings between the entry to said compression roller and the vertical tangent to said compression roller allows the formation of an area in which the powder is going to concentrate thus leading to the "corner effect" which with the simultaneous spreading of the roving by said compression roller allows a preimpregnation over a greater width of the roving and therefore an improved preimpregnation compared to the techniques of the improved prior art.

Throughout the description, all angle values given are expressed in absolute value.

Advantageously, the angle $\alpha_1$ is included from 0 to 89°, preferably 5° to 85°, preferably 5° to 45° and preferably 5° to 30°.

However, an angle $\alpha_1$ included from 0 to 5° is likely to give rise to risks of mechanical stress, which will lead to breakage of fibers and an angle $\alpha_1$ included from 85° to 89° does not create sufficient mechanical force for creating "the corner effect."

A value of the angle $\alpha_1$ equal to 0° therefore corresponds to a vertical fiber. It is obvious that the height of the cylindrical compression roller is adjustable thus making it possible to position the fiber vertically.

Advantageously, the entry edge of the tank (23a) is equipped with a roller, in particular a cylindrical and rotary roller, on which said roving or rovings travel thus leading to a spreading prior to the preimpregnation.

It is obvious that "the corner effect" caused by the angle $\alpha_1$ enhances the preimpregnation on one surface but the spreading of said roving obtained with the compression roller also makes it possible to have a preimpregnation on the other surface of said roving. In other words, said preimpregnation is enhanced on one surface of said roving or rovings near the angle $\alpha_1$ formed by said roving or rovings between the entry to said at least one compression roller $R_1$ and the vertical tangent to the compression roller $R_1$ but the spreading also makes preimpregnation of the other surface possible.

The angle $\alpha_1$ is as defined above.

Advantageously, the diameter by volume D90 of the thermoplastic polymer powder particles is included from 30 to 500 μm, advantageously from 80 to 300 μm.

Advantageously, the diameter by volume D10 of the thermoplastic polymer powder particles is included from 5 to 200 μm, advantageously from 15 to 100 μm.

Advantageously, the diameter by volume of the particles of thermoplastic polymer powder is included in the D90/D10 ratio, or included from 1.5 to 50, advantageously from 2 to 10.

Advantageously, the diameter by volume D50 of the thermoplastic polymer powder particles is included from 10 to 300 μm, notably from 30 to 200 μm and more specifically from 45 to 200 μm.

The diameters by volume of the particles (D10, D50 and D90) are defined according to the ISO 9276:2014 standard.

"D50" corresponds to the average diameter by volume, that is the value of the particle size which divides the examined particle population exactly in two.

"D90" corresponds to the value at 90% of the cumulative curve of the particle size distribution by volume.

"D10" corresponds to the corresponds to the size of 10% of the volume of the particles.

According to other variants, two, three or more rollers can be present in the fluidized bed.

Spraying by Spray Gun:

The step of preimpregnation of the fibrous material can also be done by sending one or more rovings into a device for continuous preimpregnation by spraying that comprises a tank comprising one or more nozzle(s) or one or more gun(s) spraying the polymer powder on the fibrous material at the entry roller.

The polymer or polymer powder(s) is sprayed on said fibrous material in the tank by means of nozzle(s) or spray gun(s) near the supporting part notably of the compression roller (on entry). The roving(s) circulate through this tank.

Figure 3:
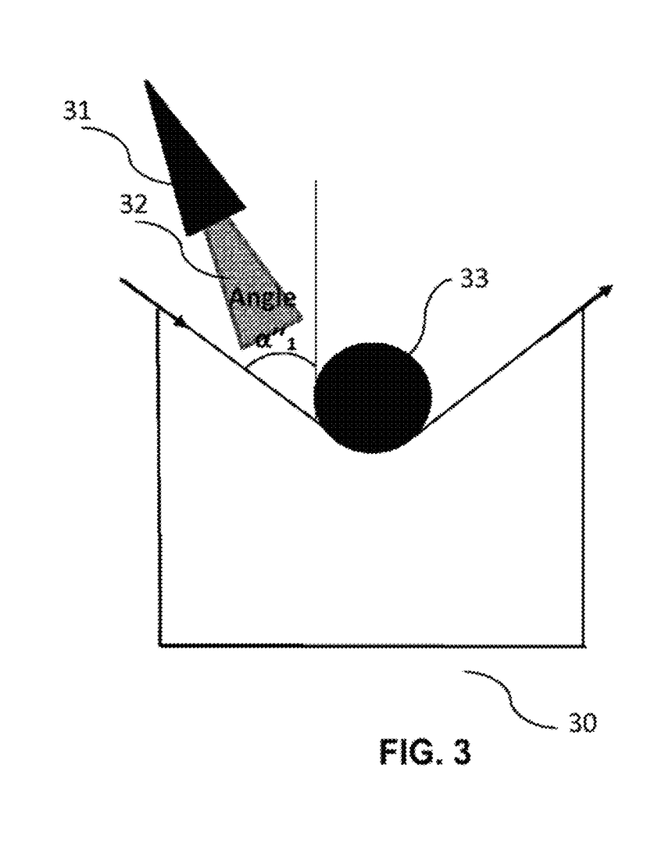
FIG. 3 presents describes an embodiment with a single compression roller, with a tank (30) comprising a spray gun (31) for powder (32) in which a single cylindrical compression roller (33) is present and showing the angle $\alpha''_1$. The arrows near the fiber indicate the direction of travel of the fiber.

An example with a spray gun is shown in FIG. 3, without being limited thereto.

All the characteristics of the supporters, and in particular the compression rollers, the spreading, and the angle $\alpha_1$ causing the corner effect and detailed for the fluidized bed are also valid for spraying by spray gun.

According to other variants, two, three or more rollers can be present each having a spray gun.

Second Step: Heating

The step of preimpregnation can therefore be done by any means provided or not with at least one supporter (E').

The presence of the supporter allows the spreading of the roving and improves the preimpregnation. However, the presence of this supporting part is not indispensable as long as a heating system provided with at least one supporting part (E) is present after the preimpregnation step.

The expression "supporting part (E)" means any system over which the roving has the possibility of traveling. The supporting part (E) can have any shape so long as the roving can travel over it. It can be fixed or rotating.

The heating system is any system releasing heat or emitting radiation which could heat the supporting part (E).

It can be an infrared heater, UV lamp or convection heater.

The supporting part (E) is consequently conducting or absorbs the radiation emitted by the heat.

The expression "heat-conducting supporting part (C)" means that the supporting part (E) is made up of material capable of absorbing and conducting heat.

It can also be a microwave or laser heating system.

In this case, the supporting part does not conduct heat or does not absorb the radiation emitted by the heat.

The expression "non-heat-conducting supporting part (C)" means that the supporting part (E) is made up of material incapable of absorbing and conducting heat.

Said at least one supporting part (E) is located or included in the environment of the heating system, meaning that it is not outside the heating system.

Advantageously, said heating system is mounted over said at least one supporting part (E). The heating system has a level sufficient so that the polymer present on the roving can melt but without breaking down said polymer.

However, said heating system comprises either solely said at least one supporting part (E) but may also comprise a portion of the roving outside of said supporting system (E), where said portion of roving is located before and/or after said supporting system (E).

Figure 4:
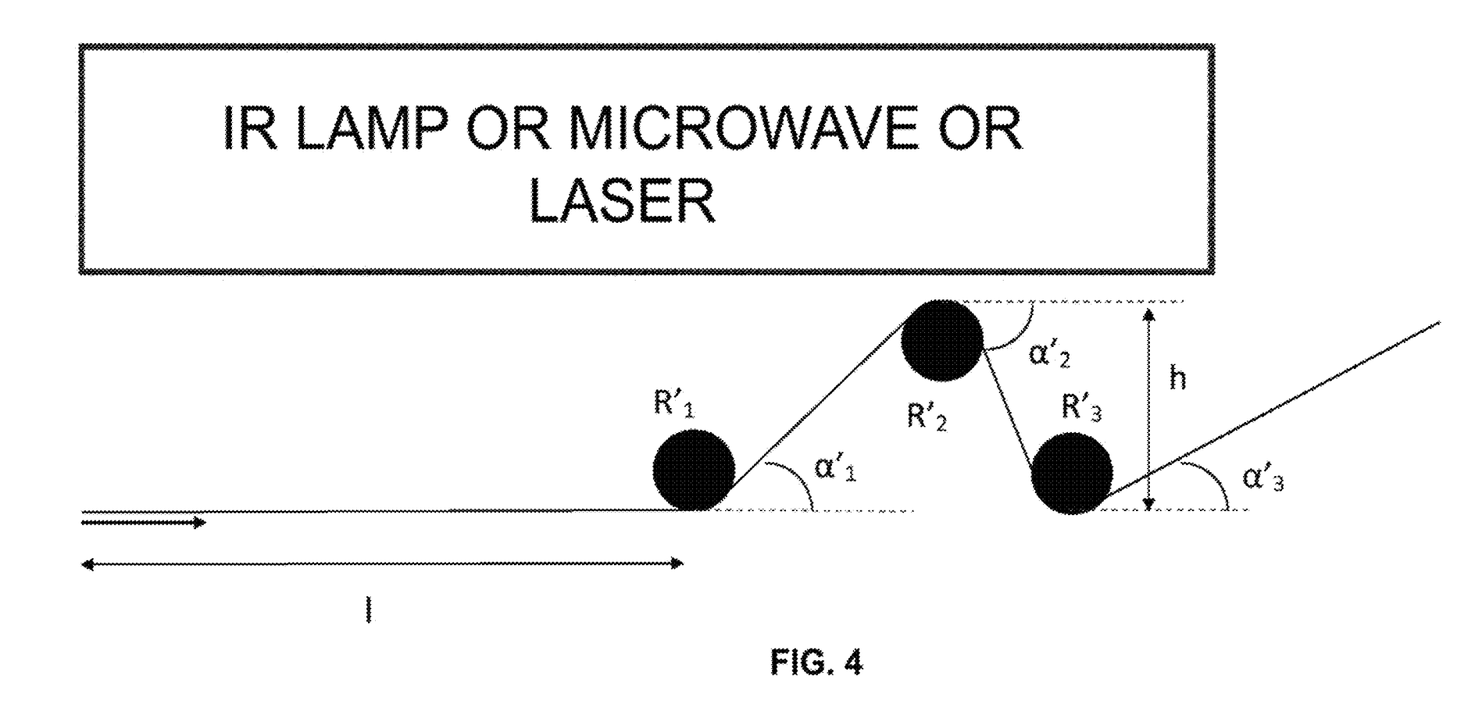
FIG. 4 shows a drawing of a three roller-heating system.

A representation of the heating system and three supporters (E), corresponding to $R'_1$, $R'_2$ and $R'_3$ is shown in FIG. 4, without being limited in any way thereto.

It is obvious that a second heating system can be present under the supporters thus allowing a uniform melting of said polymer on both surfaces of the roving.

The heating system shown in FIG. 4 is a horizontal system. However, the heating system(s) can be arranged vertically with travel of the roving through the supporters also vertical.

Consequently, this heating step serves to complete the impregnation of the roving done previously during the preimpregnation step and notably to get an impregnation that is homogeneous and to the core.

Effectively, whatever the system used for the preimpregnation step, a first spreading occurs during that step, in particular if the preimpregnation step is done with the use of supporting parts (E'), such as in a fluidized bed with at least one supporter as described above.

A first spreading of the roving occurs near said compression rollers corresponding to the supporting parts (E') with a "corner effect" because of the partial or full travel of said roving over said supporter(s) (E') and the second spreading occurs during the heating step near said compression rollers corresponding to the supporting parts (E) because of the partial or full travel of said roving over said supporter(s) (E).

The second spreading is preceded during the passage of the roving in the heating system, before partial or full travel thereof over said supporter(s) (E), by the shrinkage of the roving because of the melting of the polymer on said roving.

This second spreading combined with melting of said polymer matrix by the heating system and the shrinkage of the roving serves to homogenize the preimpregnation and thus finalize the impregnation, and to thus have an impregnation to the core and have a high fiber level by volume, in particular constant in at least 70% of the volume of the strip or ribbon, in particular in at least 80% of the volume of the strip or ribbon, in particular in at least 90% of the volume of the strip or ribbon, more specifically in at least 95% of the volume of the strip or ribbon, and also to reduce the porosity.

Advantageously, the spreading percentage during the heating step between the entry to the first compression roller $R'_1$ and the exit from the last compression roller R', is about 0 to 300%, in particular from 0 to 50%.

The various spreadings during the heating step combined with the melting of the thermoplastic polymer and the shrinkage of the roving during said heating step make it possible to produce an impregnated fiber level after the heating step included from 45% to 64% by volume, preferably from 50% to 60% by volume, in particular from 54 to 60% by volume (fiber level which cannot be reached by conventional techniques by molten route), where the fiber level by volume and the distribution of fibers is substantially identical on average on either side of the median plane of the fibrous material over the full length of said fibrous material thus leading to obtaining a notably single-layer fibrous material. Below 45% fibers, the reinforcement is not of interest as it relates to the mechanical properties.

Above 65%, the limits of the method are reached and the mechanical properties are lost again.

Advantageously, the porosity level of said impregnated fibrous material is less than 10%, notably less than 5% and in particular less than 2%.

This therefore makes it possible to work with high travel speeds and thus reduce the production costs.

Shaping Step

Optionally a step is done of shaping the roving or said parallel rovings of said impregnated fibrous material.

A calendaring system such as described in WO 2015/121583 can be used.

According to another aspect, the present invention relates to the use of an impregnated fibrous material, such as defined above, for the preparation of calibrated ribbons suitable for the manufacture of three-dimensional composite parts by automatic application of said ribbons by means of a robot.

According to another aspect, the present invention relates to a ribbon comprising at least one fibrous material as defined above.

Advantageously, said ribbon is a unidirectional single ribbon or a plurality of unidirectional parallel ribbons.

Advantageously said ribbon has a width (l) and thickness (ep) suitable for robot application in the manufacture of three-dimensional parts, without the need for slitting, and preferably a width (l) of at least 5 mm and up to 400 mm, preferably between 5 and 50 mm, and even more preferably between 5 and 15 mm.

Advantageously, the thermoplastic polymer of said ribbon is a polyamide such as defined above.

Advantageously it is notably selected from an aliphatic polyamide such as PA 6, PA 11, PA 12, PA 66, PA 46, PA 610, PA 612, PA 1010, PA 1012, PA 11/1010 or PA 12/1010 or a semi-aromatic polyamide such as PA MXD6 and PA MXD10 or selected from PA 6/6T, PA 6I/6T, PA 66/6T, PA 11/10T, PA 11/6T/10T, PA MXDT/10T, PA MPMDT/10T, PA BACT/6T, PA BACT/10T and PA BACT/10T/6T, PVDF, PEEK, PEKK and PEI or a mixture thereof.

Advantageously, it is selected from notably an aliphatic polyamide such as PA 6, PA 11, PA 12, PA 11/1010 or PA 12/1010 or a semi-aromatic polyamide such as PA MXD6 and PA MXD10 or selected from PA 6/6T, PA 6I/6T, PA 66/6T, PA 11/10T, PA 11/6T/10T, PA MXDT/10T, PA MPMDT/10T and PA BACT/10T, PA BACT/6T, PA BACT/10T/6T.

According to another aspect, the present invention relates to the use of a ribbon such as defined above in the production of three-dimensional composite parts.

Advantageously, said production of said composite parts relates to the fields of transportation, in particular automobile, petroleum and gas, in particular offshore, gas storage, aeronautics, nautical and rail; renewable energies, in particular wind, tidal, energy storage devices, solar panels; thermal protection panels; sports and recreation, health and medical, and electronics.

According to another aspect, the present invention relates to a three-dimensional composite part, characterized in that it results from the use of at least one unidirectional ribbon of impregnated fibrous material as defined above.

DETAILED DESCRIPTION OF THE INVENTION

Advantageously, the fibrous material is selected from carbon fiber rovings greater than or equal to 30K notably greater than or equal to 50K and fiberglass rovings whose grammage is greater than or equal to 1200 Tex, notably greater than or equal to 2400 Tex, greater than or equal to 4800 Tex Advantageously, the thermoplastic prepolymer used for impregnating the carbon fiber is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof.

Advantageously, the thermoplastic prepolymer used for impregnating the fiberglass is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PEKK and a PEI or a mixture thereof.

Advantageously, the fibrous material includes carbon fiber rovings greater than or equal to 30K notably greater than or equal to 50K and the thermoplastic polymer used for pre-impregnating the carbon fiber is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof.

Advantageously, the fibrous material is made up of carbon fiber rovings greater than or equal to 30K, notably greater than or equal to 50K and the thermoplastic polymer used for preimpregnating the carbon fiber is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof.

Advantageously, the fibrous material includes fiberglass rovings whose grammage is greater than or equal to 1200 Tex, notably greater than or equal to 2400 Tex, greater than or equal to 4800 Tex and the thermoplastic polymer used for pre-impregnating the fiberglass is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof.

Advantageously, the fibrous material is made up of fiberglass rovings whose grammage is greater than or equal to 1200 Tex, notably greater than or equal to 2400 Tex, greater than or equal to 4800 Tex and the thermoplastic polymer used for pre-impregnating the fiberglass is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof.

Advantageously, the fibrous material comprises carbon fiber rovings greater than or equal to 30K, notably greater than or equal to 50K and the thermoplastic polymer used for preimpregnating the carbon fiber is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof and the Tg of said thermoplastic polymer is 80° C., notably 100° C., in particular 120° C. and notably 140° C. or the Tm is 150° C.

Advantageously, the fibrous material is made up of carbon fiber rovings greater than or equal to 30K, notably greater than or equal to 50K and the thermoplastic polymer used for preimpregnating the carbon fiber is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof and the Tg of said thermoplastic polymer is ≥80° C., notably ≥100° C., in particular 120° C. and notably ≥140° C. or the Tm is ≥150° C.

Advantageously, the fibrous material comprises fiberglass rovings whose grammage is greater than or equal to 1200 Tex, notably greater than or equal to 2400 Tex, greater than or equal to 4800 Tex and the thermoplastic polymer used for pre-impregnating the fiberglass is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof and the Tg of said thermoplastic polymer is 80° C., notably 100° C., in particular 120° C. and notably 140° C. or the Tm is 150° C.

Advantageously, the fibrous material is made up of fiberglass rovings whose grammage is greater than or equal to 1200 Tex, notably greater than or equal to 2400 Tex, greater than or equal to 4800 Tex and the thermoplastic polymer used for pre-impregnating the fiberglass is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof and the Tg of said thermoplastic polymer is 80° C., notably 100° C., in particular 120° C. and notably 140° C. or the Tm is 150° C.

EXAMPLES

The following examples illustrate the scope of the invention, without limitation.

Example 1 (Comparison Example)

A roving of Zoltek, 50K carbon fiber was impregnated with PA MPMDT/10T such as described in WO 2015/121583.

D50=115 μm

Figure 5:
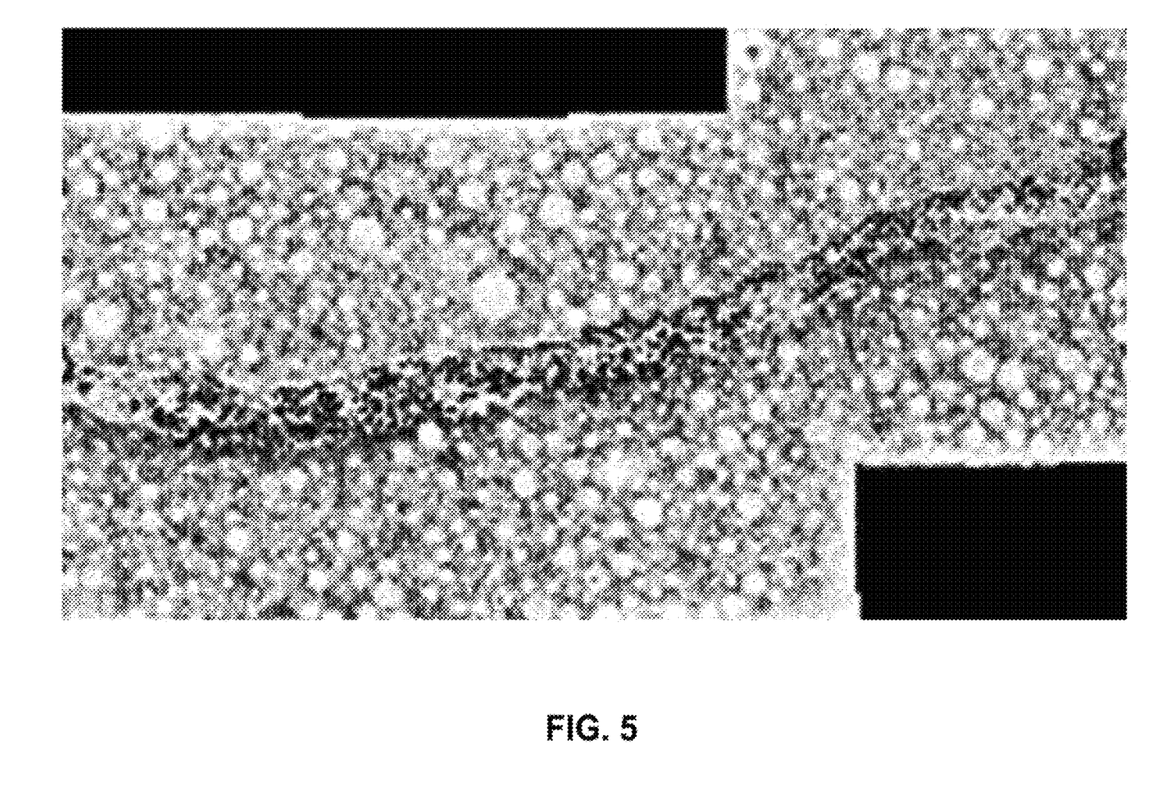
FIG. 5 shows a photo taken with a scanning electron microscope of a section view of a Zoltek, 50K carbon fiber roving impregnated with a PA MPMDT/10T polyamide powder with D50=115 µm according to example 1 and described in WO 2015/121583 (before calendaring). The method according to WO 2015/121583 leads to a fibrous material which is lacking homogeneity in several areas of the impregnated roving and also a major porosity and a bad distribution of fibers. The diameter of one fiber represents 7 µm.

Results:

The results are given in FIG. 5 and show a lack of homogeneity in several areas of the impregnated roving and also a major porosity and a bad distribution of fibers.

Example 2: Fibrous Material (Zoltek, 50K Carbon Fiber) Single Layer, Impregnated with MPMDT/10T The following operating mode was executed:

Four cylindrical and fixed rollers with 8 cm diameter are present upstream from the tank comprising the fluidized bed and the roving travels over them.

The rollers are 54 cm apart (distance between the first and last roller).

Preimpregnation step by fluidized bed

A cylindrical compression roller $R_1$, 25 cm diameter, in the tank (L=500 mm, W=500 mm, H=600 mm).

0.3 second residence time in the powder

Angle $\alpha_1$ is 25°

D50=115 μm, (D10=49 μm, D90=207 μm) for the MPMDT/10T powder.

Edge of the tank equipped with a fixed roller.

Heating Step

The heating system used is the one described in FIG. 4, but with eight fixed cylindrical rollers $R'_1$ á R's with 8 mm diameter.

The feed speed of the roving is 10 m/min.

The infrared used has a power of 25 kW; the height between the infrared and the upper roller is 4 cm and the height between the infrared and the lower rollers is 9 cm.

The angles $\alpha'_1$ to $\alpha'_8$ are identical and are 25°.

The height h is 20 mm

The length l is 1000 mm

The eight rollers are each 43 mm apart.

Calendaring after the heating step by means of two calendars mounted in series equipped with a 1 kW IR each.

Figure 6:
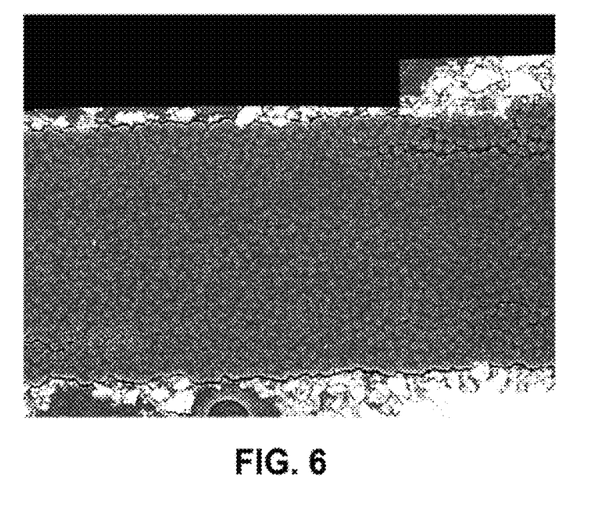
FIG. 6 shows a photo taken with a scanning electron microscope of a cross-section view of a Zoltek, 50K carbon fiber roving impregnated with a PA MPMDT/10T polyamide powder with D50=115 µm according to invention example 2 (before calendaring). The diameter of one fiber represents 7 µm.

FIG. 6 shows the resulting impregnated fibrous material.

The resulting fibrous material is a single layer material which has an impregnation homogeneity and a low porosity with a very good distribution of the fibers.

Example 3: Determination of the Porosity Level by Image Analysis

The porosity was determined by image analysis on a roving of 50K carbon fiber impregnated by MPMDT/10T in fluidized bed followed by a heating step such as defined above.

It is under 5%.

Example 4: Determination of the Porosity Level the Relative Difference Between Theoretical and Experimental Density (General Method)

a) The required data are:

The density of the thermoplastic matrix

The density of the fibers

The grammage of the reinforcement:
  linear density (g/m), for example, for a ¼ inch tape (coming from a single roving)
  surface density (g/m²) for example, for a wider tape or fabric b) Measurements to do:

The number of samples must be at least 30 so that the result is representative of the material studied.

The measurements to be done are:

The dimensions of the samples collected:
  Length (if the linear density is known).
  Length and width (if the surface density is known).

The experimental density of the samples collected:
  Mass measurements in air and in water.

The measurement of the fiber level is determined according to ISO 1172:1999 or by thermogravimetric analysis (TGA) such as determined in the document B. Benzler, Applications Laboratory, Mettler Toledo, Giesen, UserCom 1/2001.

The measure of the carbon fiber level can be determined according to ISO 14127:2008.

Determination of the theoretical density from the fiber level:

a) Determination of the theoretical density from the fiber level:

$$\% Mf_{th} = \frac{m_l \cdot L}{Me_{air}}$$

where $m_l$ the linear density of the tape,

L the length of the sample, and $Me_{air}$ the mass of the sample measured in air.

The variation of the fiber density level is assumed to be directly related to a variation of the matrix level without considering the variation of the quantity of fibers in the reinforcement.

b) Determination of the theoretical density:

$$d_{th} = \frac{1}{\frac{1 - \% Mf_{th}}{d_m} + \frac{\% Mf_{th}}{d_f}}$$

where $d_m$ and $d_f$ are the respective densities of the matrix and the fibers.

The theoretical density thus calculated is the achievable density if there are no porosities in the samples.

c) Evaluation of the porosity:

The porosity is then the relative difference between theoretical density and experimental density.

The invention claimed is:

1. An impregnated fibrous material comprising a fibrous material of continuous fibers and at least one thermoplastic polymer matrix, wherein at least one thermoplastic polymer is a non-reactive amorphous polymer whose glass transition temperature is such that Tg≥80° C., or a non-reactive semi-crystalline polymer whose melting temperature is Tf≥150° C., where Tg and Tf are determined by differential scanning calorimetry (DSC) according to standard 11357-2:2013 and 11357-3:2013 respectively, a fiber content by volume is constant in at least 70% of the volume of the impregnated fibrous material, the fiber content in said impregnated fibrous material being between 45 and 65% by volume on both sides of said fibrous material, a porosity rate in said impregnated fibrous material being less than 10%, said impregnated fibrous material being free of non-reactive liquid crystal polymers (LCP), wherein a number average molecular weight (Mn) changes by less than 50% during its implementation, said impregnated fibrous material being a monolayer, wherein impregnation is carried out with at least one expansion.

2. The impregnated fibrous material according to claim 1, wherein a number of fibers in said fibrous material for carbon fibers is greater than or equal to 30K or a weight for glass fiber is greater than or equal to 1200 Tex.

3. The impregnated fibrous material according to claim 1, wherein at least one thermoplastic polymer is selected from: polyaryl ether ketones (PAEK); polyaryl ether ketone ketone (PAEKK); aromatic polyether imides (PEI); polyaryl sulfones; polyarylsulfides; polyamides (PA); polyether block amides (PEBAs); polyolefins; and mixtures thereof.

4. The impregnated fibrous material according to claim 1, wherein the at least one thermoplastic polymer is selected from polyamides, polyether ether ketones (PEKK), aromatic polyether imides (PEI) and a mixture of PEKK and PEI.

5. The impregnated fibrous material according to claim 4, wherein said polyamides are selected from aliphatic polyamides, cycloaliphatic polyamides and semi-aromatic polyamides (polyphthalamides).

6. The impregnated fibrous material according to claim 5, wherein said aliphatic polyamide is selected from polyamide 6 (PA-6), polyamide 11 (PA-11), polyamide 12 (PA-12), polyamide 66 (PA-66), polyamide 46 (PA-46), polyamide 610 (PA-610), polyamide 612 (PA-612), polyamide 1010 (PA-1010), polyamide 1012 (PA-1012), polyamide 11/1010, polyamide 12/1010, or a mixture thereof or a copolyamide thereof, and block copolymers, and said semi-aromatic polyamides, is a semi-aromatic polyamide, optionally modified with urea units selected from an MXD6 and an MXD10 or a semi-aromatic polyamide of formula X/YAr, selected from a semi-aromatic polyamide of formula A/X·T in which A is selected from a unit obtained from an amino acid, a unit obtained from a lactam and a unit corresponding to the formula (Ca diamine)·(Cb diacid), with a representing the number of carbon atoms of the diamine and b representing the number of carbon atoms of the diacid, a and b each being between 4 and 36, the unit (Ca diamine) being selected from aliphatic diamines, linear or branched, cycloaliphatic diamines and alkylaromatic diamines and the unit (Cb diacid) being chosen from aliphatic, linear or branched diacids, cycloaliphatic diacids and aromatic diacids;

X·T denotes a unit obtained from the polycondensation of a Cx diamine and terephthalic acid, with x representing the number of carbon atoms of the Cx diamine, x being between 6 and 36, T corresponding to terephthalic acid, MXD corresponding to m-xylylene diamine.

7. The impregnated fibrous material according to claim 1, wherein said fibrous material comprises continuous fibers selected from carbon, glass, silicon carbide, basalt, silica, flax or hemp, lignin, bamboo, sisal, silk, or cellulose, or amorphous thermoplastic fibers with a glass transition temperature Tg higher than the Tg of said thermoplastic polymer matrix when the latter is amorphous or higher than the Tf of said thermoplastic polymer matrix when the latter is semi-crystalline, or the semi-crystalline thermoplastic fibers with a melting temperature Tf higher than the Tg of said thermoplastic polymer matrix when the latter is amorphous or higher than the Tf of said thermoplastic polymer matrix when the latter is semi-crystalline, or a mixture of two or more of said fibers.

8. The impregnated fibrous material according to claim 1, wherein said thermoplastic polymer further comprises carbonaceous fillers.

9. A method of using the impregnated fibrous material, as defined in claim 1, for the preparation of calibrated ribbons suitable for the manufacture of three-dimensional composite parts by automatic application of said ribbons by means of a robot.

10. A ribbon comprising at least one impregnated fibrous material as defined in claim 1.

11. The ribbon according to claim 10, wherein it is made of a single unidirectional ribbon or a plurality of parallel unidirectional ribbons.

12. The ribbon according to claim 10, wherein it has a width (l) and a thickness (ep) suitable for robot application in the manufacture of three-dimensional workpieces, without the need for slitting, the width (l) being of at least 5 mm and up to 400 mm.

13. The ribbon according to claim 11, wherein the at least one thermoplastic polymer is a polyamide selected from an aliphatic polyamide PA 6, PA 11, PA 12, PA 66, PA 46, PA 610, PA 612, PA 1010, PA 1012, PA 11/1010 or PA 12/1010 or a semi-aromatic polyamide selected from a PA MXD6 and a PA MXD10 or chosen from PA 6/6T, PA 61/6T, PA 66/6T, PA 11/10T, PA 11/6T/10T, PA MXDT/10T, PA MPMDT/10T, PA BACT/6T, PA BACT/10T and PA BACT/10T/6T, a poly(vinylidene fluoride) (PVDF), a polyether ether ketone (PEEK), polyether ketone ketone (PEKK), and an aromatic polyether imide (PEI) or a mixture thereof.

14. The ribbon according to claim 13, wherein the thermoplastic polymer is a polyamide selected from an aliphatic polyamide selected from PA 6, PA 11, PA 12, PA 11/1010 or PA 12/1010 or a semi-aromatic polyamide selected from PA 6/6T, PA 61/6T, PA 66/6T, PA 11/10T, PA 11/6T/10T, PA MXDT/10T, PA MPMDT/10T and PA BACT/10T, T corresponding to terephthalic acid, MXD corresponding to m-xylylene diamine, MPMD corresponding to methylpentamethylene diamine and BAC corresponding to bis(aminomethyl)cyclohexane.

15. A method of using the ribbon, as defined according to claim 10, in the manufacture of three-dimensional composite parts.

16. The method according to claim 15, wherein said manufacture of said composite parts relates to the fields of transportation, oil and gas, gas storage, aeronautics, nautical, railways; renewable energies selected from wind energy, hydro turbines, energy storage devices, solar panels; thermal protection panels; sports and leisure, health and medical and electronics.

17. A three-dimensional composite part, wherein it results from the use of at least one unidirectional ribbon of impregnated fibrous material as defined according to claim 10.

* * * * *